J. P. LAVIGNE.
GEARING.
APPLICATION FILED AUG. 24, 1910.

993,326.

Patented May 23, 1911.

Witnesses
A. M. Shannon.
G. E. McGrann

Inventor
Joseph P. Lavigne
By Barthel & Barthel
Attorneys

UNITED STATES PATENT OFFICE.

JOSEPH P. LAVIGNE, OF DETROIT, MICHIGAN.

GEARING.

993,326.

Specification of Letters Patent.  Patented May 23, 1911.

Application filed August 24, 1910. Serial No. 578,790.

*To all whom it may concern:*

Be it known that I, JOSEPH P. LAVIGNE, a citizen of the United States of America, residing at Detroit, in the county of Wayne and State of Michigan, have invented certain new and useful Improvements in Gearing, of which the following is a specification, reference being had therein to the accompanying drawings.
This invention relates to steering gear for motor vehicles and its object is to provide a simple, compact and efficient construction having suitable automatically operating means to take up the lost motion caused by wear.

Figure 1:
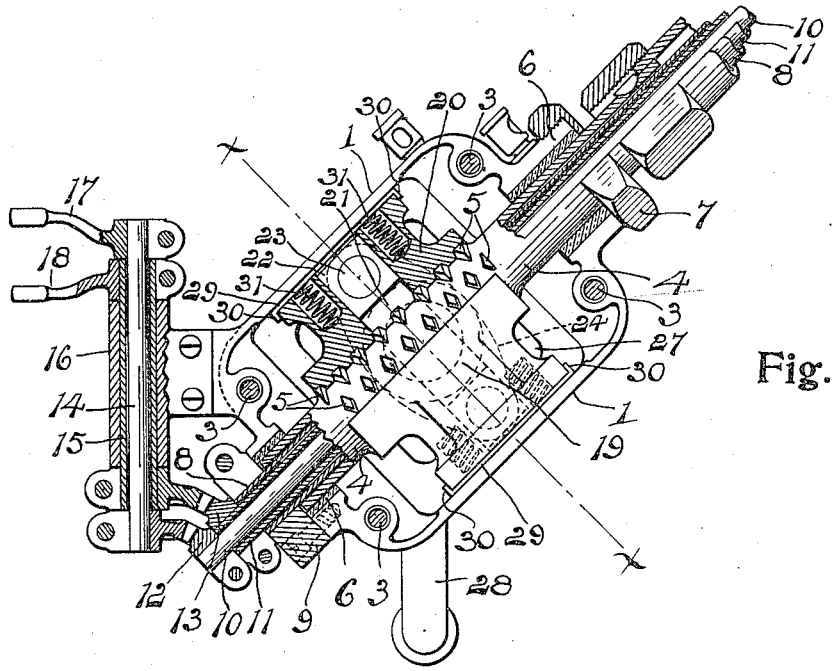
Figure 2:
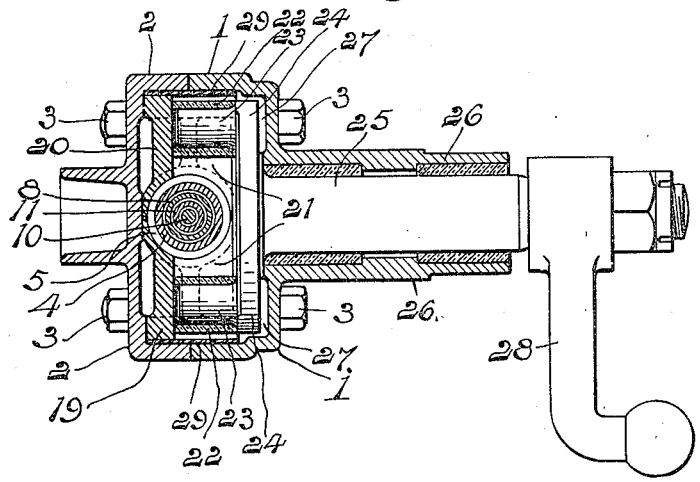

To this end the invention consists in the construction and arrangement of parts all as hereinafter more fully described reference being had to the accompanying drawing in which, Figure 1 is a side elevation of a device embodying the invention with one-half of the casing removed and parts in section to show the construction; and Fig. 2 is a transverse section of the same upon line x—x of Fig. 1.

A suitable casing is made in two parts 1 and 2 secured together by means of transverse bolts 3 and mounted in this casing extending longitudinally therethrough is a hollow shaft or spindle 4 provided within the casing with cross cut or diamond shaped threads 5 forming right and left hand screwthreads on the shaft. Suitable bearings 6 are formed in the ends of the casing for the shaft and the outer end of the upper bearing is externally screwthreaded to receive a nut 7 which forms a cap for the bearing and also serves to firmly hold the two parts of the casing together. Extending through the hollow shaft 4 is a tube 8 which is held at its lower end from turning with the shaft by a fixed collar 9 secured to the casing in any suitable manner. Within the fixed tube is an axial rod 10 and a rotatable tube or sleeve 11 upon the rod, both extending through the fixed tube 8 and projecting therefrom at their lower ends to which ends are secured segmental gears 12 and 13 for engaging similar gears secured, one upon a rod 14 and the other upon a sleeve 15 upon the rod, said rod and sleeve being mounted in a vertical position to turn freely within a bearing 16 provided therefor upon the lower end of the part 1 of the casing. Secured to the upper end of the rod 14 and sleeve 15 are suitable arms 17 and 18 for transmitting motion to the controlling devices of a motor. The casing is substantially rectangular in cross section and mounted to slide within the casing and in engagement with the screwthreaded portion of the shaft 4, is a nut formed in two parts or halves 19 and 20, one part formed with a right hand and the other with a left hand internal screwthread so that when the shaft is turned the two halves of the nut will be moved in opposite directions. Each half of the nut is formed with a transverse slot 21 at one side intermediate its ends to receive blocks 22 which are free to slide therein toward and from the shaft 4. These blocks form bearings for studs 23 upon the ends of a plate 24 formed integral with a rock shaft 25 extending laterally outward through a bearing 26 in one side of the casing. The plate 24 lies close to the side of the nut within a recess 27 in the side of the part 1 of the casing and when the shaft 4 is turned to move one-half of the nut in one direction and the other half in the other direction, said plate will be turned and actuate the rock shaft by reason of the engagement of its studs 23 with the bearing blocks 22 which are carried within the guide grooves 21 of the two parts of the nut and move with said parts longitudinally of the shaft 4.

Secured in any suitable manner to the outer end of the rock shaft, is a crank arm 28 for transmitting motion to steering knuckles or other parts to be actuated by the steering gear.

Wear plates 29 are interposed between each half of the nut and the adjacent side of the casing, these plates having downturned ends 30 to engage the ends of the nut and cause the plates to move therewith when the nut is moved by the turning of the shaft. Coiled springs 31 within recesses in the two halves of the nut press outwardly upon the plates 29 and force the plates into firm engagement with the casing and hold the parts of the nut pressed into firm engagement with the shaft to take up any lost motion caused by wear of the parts.

The two halves of the nut being connected by the transverse plate 24 within the casing and being arranged to move in opposite directions, no thrust bearing for the shaft is required, and said plate being formed integral with the end of the rock shaft 25, makes a direct connection between the nut and the crank arm 28 and obviates the necessity for pivotal connections for transmitting the motion.

Having thus fully described my invention what I claim is:

1. A device of the character described comprising a casing, a shaft in said casing, a nut in said casing formed in parts and having screwthreaded engagement with said shaft to be moved longitudinally within said casing by the turning of said shaft, gibs between the outer sides of the parts of said nut and the adjacent sides of the casing movable with said parts, and springs exerting an outward pressure on said gibs and an inward pressure upon the parts of said nut.

2. A device of the character described comprising a casing, a shaft in said casing, a nut in said casing formed in parts and having screwthreaded engagement with said shaft to be moved longitudinally within said casing by the turning of said shaft, gibs between the outer sides of the parts of the nut and the adjacent sides of the casing movable with said parts, and springs carried by said parts of said nut in recesses therein and bearing against the inner sides of said gibs.

3. A device of the character described comprising a casing, a shaft in said casing provided with a right and a left hand screw thread, a nut in said casing formed of separate halves, one-half being formed with a right hand screw thread and the other half with a left hand screw thread to engage the screw threads of the shaft, said halves being also provided with recesses in their outer sides, plates interposed between the outer sides of the halves of the nut and the adjacent sides of the casing, said plates being formed with inwardly turned ends to engage the ends of the nut and move therewith, and coiled springs exerting an outward pressure on the plates and an inward pressure on the halves of the nut.

4. A device of the character described comprising a casing, a shaft in said casing, a nut in said casing formed of separate members each having screwthreaded engagement with said shaft to be moved in a direction opposite to that of the other member by the turning of said shaft, a rock shaft mounted in a bearing on the casing intermediate the ends of said nut and extending laterally outward from the casing, and means on the inner end of said rock shaft engaging one member of the nut at one side of the axis of said rock shaft and engaging the other member of the nut at the opposite side of the axis of said rock shaft to turn said shaft by the movement of the oppositely movable members of the nut.

5. A device of the character described comprising a casing, a shaft in said casing, a nut in said casing formed of separate members each having screwthreaded engagement with said shaft to be moved in a direction opposite to that of the other member when the shaft is turned, a rock shaft mounted in a bearing on the casing intermediate the ends of the nut, and a member on the end of said rock shaft, the ends of which member extend laterally from the shaft in opposite directions and are operatively engaged with the said members of said nut intermediate its ends.

6. A device of the character described comprising a casing, a shaft in said casing, a nut in said casing formed of separate members each having screwthreaded engagement with said shaft to be moved in a direction opposite to that of the other member when the shaft is turned, a rock shaft mounted in a bearing on the casing intermediate the ends of the nut and a member on the shaft extending transversely thereof and lying adjacent to one side of the nut within the casing with each of its ends operatively connected to the adjacent member of the nut intermediate the ends of said member.

7. A device of the character described comprising a casing, a shaft in said casing, a nut in said casing formed of separate members each having screwthreaded engagement with said shaft to be moved in a direction opposite to that of the other member when the shaft is turned, a rock shaft mounted in a bearing in the casing and extending laterally therefrom, a member within the casing upon the inner end of said rock shaft extending transversely thereof and across the sides of the members of the nut, and a stud on each end of the transverse member in sliding engagement with the halves of the nut.

8. A device of the character described comprising a casing, a shaft in said casing, a nut in said casing formed in separate halves each having screwthreaded engagement with said shaft to be moved in a direction opposite to that of the other half when the shaft is turned, said halves being each formed with a transverse slot in one side intermediate its ends, a rock shaft mounted in a bearing on the casing and extending laterally outward therefrom, a member on the inner end of the rock shaft within the casing extending transversely thereof, and a stud on each end of the transverse member projecting into the slot in the adjacent half of the nut.

In testimony whereof I affix my signature in presence of two witnesses.

JOSEPH P. LAVIGNE.

Witnesses:
OTTO F. BARTHEL,
ANNA M. DORR.